United States Patent
Black

(10) Patent No.: US 8,318,381 B2
(45) Date of Patent: Nov. 27, 2012

(54) DEVICE AND METHOD FOR ENHANCED AIR CIRCULATION

(75) Inventor: Greg R. Black, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1103 days.

(21) Appl. No.: 12/142,697

(22) Filed: Jun. 19, 2008

(65) Prior Publication Data

US 2009/0317677 A1 Dec. 24, 2009

(51) Int. Cl.
*H01M 8/04* (2006.01)
*H01M 8/06* (2006.01)

(52) U.S. Cl. ........ 429/515; 429/423; 429/428; 429/429; 429/442; 429/443

(58) Field of Classification Search ............... None
See application file for complete search history.

(56) References Cited

U.S. PATENT DOCUMENTS

| | | | |
|---|---|---|---|
| 5,215,834 A | 6/1993 | Reher et al. | |
| 6,191,546 B1 | 2/2001 | Bausch et al. | |
| 7,290,721 B2 | 11/2007 | Cheng | |
| 2003/0081128 A1 | 5/2003 | Kirmuss | |
| 2003/0087139 A1* | 5/2003 | White | 429/24 |
| 2003/0162063 A1* | 8/2003 | Yoshizawa et al. | 429/24 |
| 2003/0207158 A1* | 11/2003 | Bullock et al. | 429/12 |
| 2004/0223299 A1 | 11/2004 | Ghosh | |
| 2005/0129992 A1* | 6/2005 | Busenbender | 429/13 |
| 2005/0191535 A1* | 9/2005 | Penev | 429/24 |
| 2005/0249992 A1* | 11/2005 | Bitoh | 429/24 |
| 2007/0115630 A1* | 5/2007 | Midgley | 361/690 |
| 2008/0118800 A1* | 5/2008 | Devriendt et al. | 429/26 |
| 2009/0130529 A1* | 5/2009 | Yamamoto et al. | 429/34 |
| 2009/0136804 A1* | 5/2009 | Bono | 429/24 |

OTHER PUBLICATIONS

Patent Cooperation Treaty, "PCT Search Report and Written Opinion of the International Searching Authority" for International Application No. PCT/US2009/044424 Dec. 30, 2009, 11 pages.

\* cited by examiner

*Primary Examiner* — Sam P Siefke
*Assistant Examiner* — Jennifer Wecker
(74) *Attorney, Agent, or Firm* — Gary J. Cunningham

(57) ABSTRACT

A wireless communication device (200) and method (300) adapted to prolong the useful life of an energy storage device is disclosed. In its simplest form, it can include: detecting (310) a first threshold of an energy conversion module comprising at least one of a temperature threshold, oxygen threshold, voltage, a current threshold, a power threshold and moisture threshold; sensing (320) a temperature in proximity to a thermal module comprising at least one of a fuel tank, an electronic computing module, and a housing; and generating (330) an air stream based on the detected first threshold (310) and the sensed temperature (320). The device (200) and method (300) can automatically and dynamically manage, for example, temperature, oxygen and/or moisture of an energy storage module, to maintain the energy storage module within desired specifications and tolerances. This can help to prolong the useful life of the energy storage module and its components and help to maintain a maximum recharging capacity.

20 Claims, 2 Drawing Sheets

DEVICE AND METHOD FOR ENHANCED AIR CIRCULATION

BACKGROUND

1. Field

The present disclosure relates to a device and method for enhanced air circulation, and particularly for portable electronic devices.

2. Introduction

Over time, mobile devices such as wireless communication and computing devices, are achieving higher data communications rates and computing speeds. This higher performance generally comes with higher power drain which drives a need for greater energy storage capability in mobile device. Since the higher performance enables greater utility in mobile device, there is a desire for longer operational life between recharging of an energy storage device in a mobile device which further drives the need for greater energy storage capability. Further, since higher power drain causes a corresponding higher amount of heat generation in a mobile device there is a need for improved thermal dissipation. The energy storage and conversion technology in existing mobile devices relates to electrochemical cell technology. For example, lithium ion batteries are the energy storage and conversion devices used in most mobile telephones. Alternative technologies, such as fuel cell technologies, may provide greater energy storage capability but have problems including heat generation due to energy exothermic recharging and conversion inefficiency; restricted operating temperature range; a need to consume oxygen from ambient air; and condensation of generated water vapor.

Thus, there is a need for a method and device for providing enhanced air circulation for portable electronic devices, including ones that utilize energy storage devices, such as fuel cells. There is also a need for automatically and dynamically managing, for example, temperature, oxygen and/or moisture of a mobile device, to maintain the energy storage and conversion devices within desired specifications and tolerances. This can help to prolong the useful life of the energy storage module and its components.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
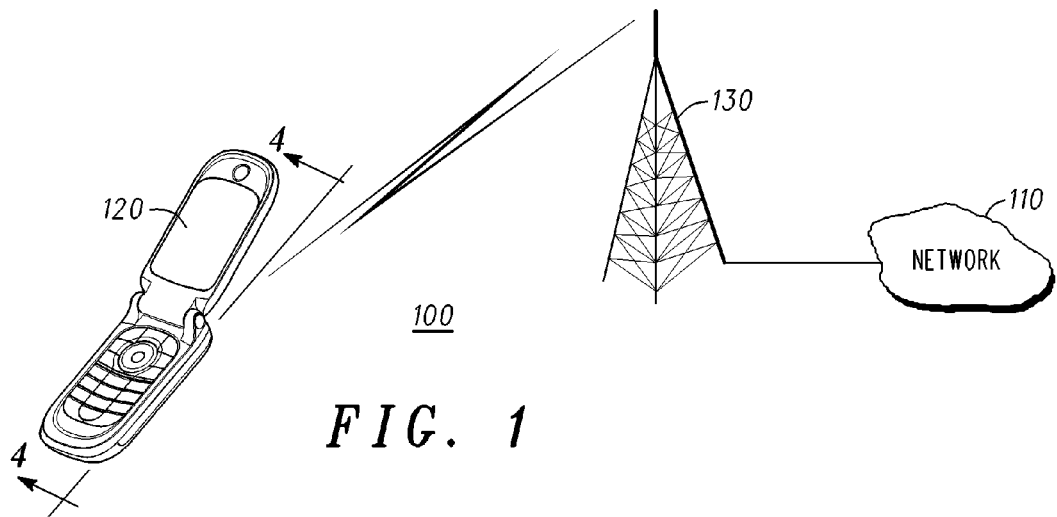
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a Third Generation (3G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130, which may also comprise local area, and/or personal area access points.

Figure 2:
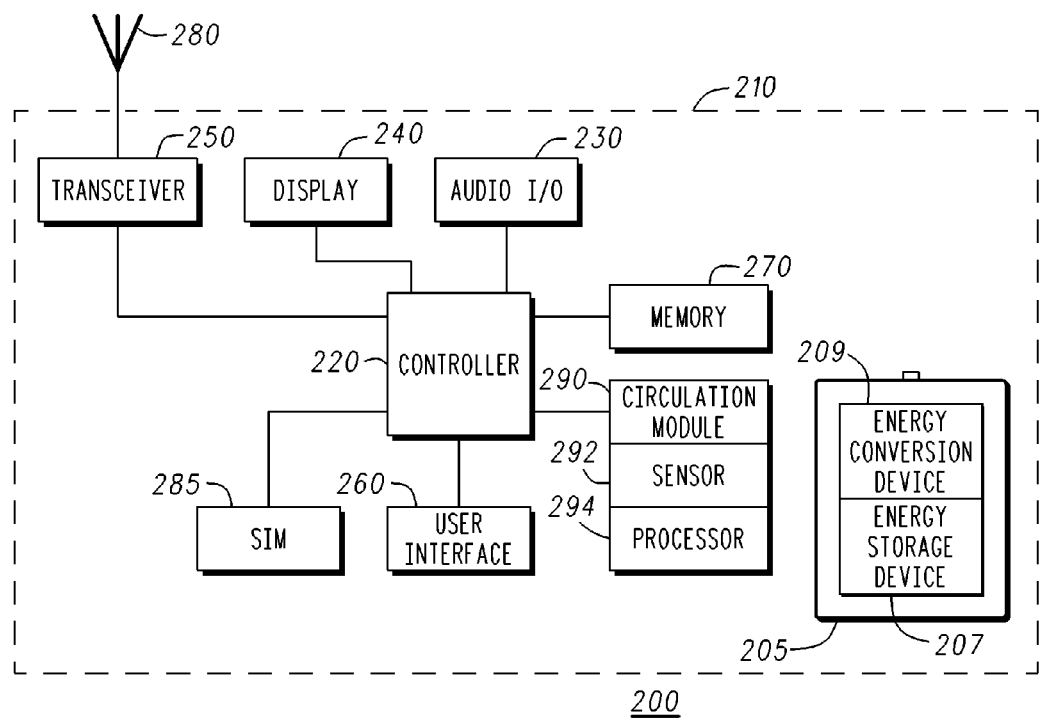
FIG. 2 is an exemplary block diagram of a wireless communication device according to one embodiment.

FIG. 2 is an exemplary block diagram of a wireless communication device 200 configured with an energy storage device or module 205, such as the terminal 120, according to one embodiment. The energy storage module may comprise a separate energy storage device 207, such as a fuel tank, and energy conversion device 209, such as a fuel cell. The energy storage and conversion devices can be integral to the energy storage module 205, proximally located within energy storage module 205 as depicted in FIG. 2, or can be separately located in the wireless communication device 200. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220.

The wireless communication device 200 further includes a circulation module 290 configured to: detect a threshold of an energy storage module 205 comprising at least one of a temperature threshold, oxygen threshold, voltage threshold and moisture threshold; sense a temperature in proximity to a thermal module; and generate an air stream based on the detected first threshold and the sensed temperature. In a preferred embodiment the thermal module is an energy storage device such as a fuel tank. In a second preferred embodiment the thermal module is an electronic computing module such as controller 220, audio circuitry 230, display 240, transceiver 250, user interface 260, memory 270, and subscriber module 285. In a third preferred embodiment the thermal module is a housing 210. Other devices in the wireless communication device 200 which are not shown in FIG. 2 may also be thermal modules. The thermal module is any device in wireless communication device 200 with a restricted operating temperature range or which generates heat which may affect the temperature of another module which operates with a restricted operating temperature range.

In one embodiment, the module 290 includes a sensor 292 and processor module 294, which are coupled to the controller 220. In more detail, the module 290 can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In more detail, the wireless communication device 200 shown in FIG. 2, can include: a housing 210; a controller 220 coupled to the housing 210, the controller 220 configured to control the operations of the wireless communication device, and to provide ancillary computing operations which may be unrelated to wireless communications such as audio or video processing, application processing, etc; memory 270 coupled to the controller 220; memory 270 coupled to the controller 220; a transceiver 250 coupled to the controller 220; and a circulation module 290 configured to detect a first threshold of an energy conversion device 209 comprising at least one of a temperature threshold, oxygen threshold, voltage threshold and moisture threshold, sense a temperature in proximity to a thermal module comprising at least one of an energy storage device 207, and electronic computing module and a housing 210, and generate an air stream based on the detected first threshold and the sensed temperature. The air stream may be generated by, for example, an electro-mechanical generator device such as a rotary motor driven fan, a linear motor driven piston, and air pump, a piezoelectric device, or the like. Importantly, for thermal control of the mobile device the air stream generation is reversible. Reversibility of the airflow may be achieved by, for example, by selecting or switching an airflow path or vent, changing vent control timing, reversing the polarity of an electrical input of an electromechanical generator, or a combination of these, or other methods.

In one form, the wireless communication device is configured with an energy storage module 205. The wireless communication device can include: a housing 210; a controller 220 coupled to the housing, the controller 220 configured to control the operations of the wireless communication device; a transceiver 250 coupled to the controller 220; and a circulation module 290 configured to detect a first threshold of an energy conversion device 209 comprising at least one of a temperature threshold, oxygen threshold, voltage threshold and moisture threshold, sense a temperature in proximity to a thermal module comprising at least one of an energy storage device 207, an electronic computing module which can comprise any device or module which generates heat or has a restricted temperature range, and a housing 210, and generate an air stream based on the detected first threshold and the sensed temperature.

In a preferred embodiment the energy storage module 205 comprises an energy conversion device 209 which is a fuel cell, and an energy storage device 207 which is a fuel tank. The fuel cell 209 can convert fuel from the fuel tank 207, into electrical energy. The electrical energy supplies and is dissipated as heat in electronic computing devices including controller 220, audio circuitry 230, display 240, transceiver 250, user interface 260, memory 270 and subscriber module 285. The dissipated heat affects the temperature of each device or module in the wireless communications device 200. The energy storage device 207 may be another source of heat. Significant heat can be generated during refueling, in the case of the energy storage device 207 containing metal hydride for adsorption of hydrogen fuel. Conversely, during operation the release of hydrogen is endothermic, resulting in lowering of temperature.

In the present state of the art, the housing 210 and the energy conversion device 209 have the most restricted operating temperature range. Since the housing 210 comes into contact with a user, its temperature threshold is determined by the safety and comfort of the user, such as about 45° C. For the energy conversion device 209, operation above an upper temperature threshold such as about 45° C. or below a lower temperature threshold such as about 0° C. may cause the energy conversion device 209 to operate at reduced output voltage, current or power. The performance impact may also be permanent, albeit to a lesser extent. With a more temperature tolerant energy conversion device, a computation device may be more temperature-restricted, most notably the controller 220, the display 240 and the memory 270.

Operation of the energy conversion device may also be restricted by the availability of oxygen. If the air supply is blocked or restricted the energy conversion device 209 may operate at reduced performance, such as with a reduced output voltage, current or power. The oxygen level may be detected by use of an oxygen sensor, or indirectly by detecting the output voltage, current or power.

Operation of the energy conversion device may also be restricted by the availability of water. Fuel cells employing a Polymer Electrolyte Membrane (PEM) for example require a minimum amount of hydration for operation, while too much water may reduce performance by, for example, blocking the flow of air to an electrode. Water vapor is also present as a byproduct of fuel cell operation. Operation of the energy conversion device 209 and other devices may be restricted by accumulation of condensed water vapor from the energy conversion device 209. The moisture level may be detected by use of a sensor, or indirectly by detecting reduced performance such as a lower output voltage, current or power of the fuel cell 209.

Advantageously, the circulation module 290 can automatically and dynamically manage, for example, temperature, oxygen and/or moisture of an energy conversion device 209, to maintain the energy conversion device 209 within desired specifications and tolerances. This can help to prolong the useful life of the energy storage module 205.

Figure 3:
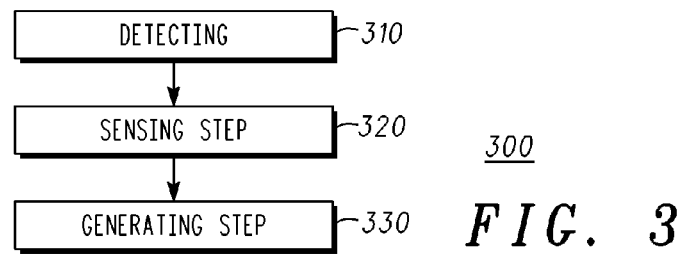
FIG. 3 is an exemplary block diagram of a wireless communication method according to one embodiment.

A block diagram of a wireless communication method 300, is shown in FIG. 3. In its simplest form, it can include: detecting 310 a first threshold of an energy conversion module comprising at least one of a temperature threshold, oxygen threshold, voltage output threshold, a current output threshold, a power output threshold, and moisture threshold; sensing 320 a temperature in proximity to a thermal module comprising at least one of an external housing, a fuel tank and an electronic computing module; and generating 330 an air stream based on the detected first threshold 310 and the sensed temperature 320.

In a first example, the method 300 is used to reduce the maximum temperature of the energy conversion device 209. The process begins at step 310. If at step 310 an energy conversion device threshold is detected, then the process proceeds to step 320. Examples of thresholds are temperature thresholds, voltage thresholds, moisture thresholds, and oxygen thresholds. If at step 320 a high temperature is sensed at the energy storage device 207, which may occur if the energy storage device has recently been refueled, then the process proceeds to step 330. At step 330 an air flow is generated, and the direction of the airflow is controlled such that heat from the energy storage device 207 is carried away from the energy conversion device 209. If at step 320 a low temperature is sensed at the energy storage device 207, which may occur if the energy storage device has recently been endothermicly discharging, then at step 330 the air flow direction is controlled such that heat from the energy storage device 207 is carried toward the energy conversion device 209. Thus the direction of the air flow is controlled to reduce the maximum temperature of the energy conversion device 209.

In a second example, the method 300 is used to increase the minimum temperature of the energy conversion device 209. Process step 310 is the same as in the first example. If at step 320 a high temperature is sensed at the energy storage device 207, then the process proceeds to step 330. At step 330 an air flow is generated, and the direction of the airflow is controlled such that heat from the energy storage device 207 is carried toward the energy conversion device 209. If at step 320 a low temperature is sensed at the energy storage device 207, then at step 330 the air flow direction is controlled such that heat from the energy storage device 207 is carried away from the energy conversion device 209. Thus the direction of the air flow is controlled to increase the minimum temperature of the energy conversion device 209.

The above first example provides a strategy to reduce the maximum temperature of a restricted temperature device, and the second example provides a strategy to increase the minimum temperature of a restricted temperature device. A third example serves to describe a method to both reduce the maximum and increase the minimum temperature of the limited temperature range device, depending on conditions. Steps 310 and 320 proceed according to the first and second examples. At step 330, if the sensed temperature of the energy storage device 207 is above the maximum operating temperature of the energy conversion device 209 then the airflow is controlled to reduce the maximum temperature of the energy conversion device 209, according to the first example. If the sensed temperature of the energy storage device 207 is below the minimum operating temperature of the energy conversion device 209 then the airflow is controlled to increase the minimum temperature of the energy conversion device 209, according to the second example.

The method 300 can automatically and dynamically manage, for example, temperature, oxygen and/or moisture of an energy storage module, to maintain the energy storage module within desired specifications and tolerances. This can help to prolong the useful life of the energy storage module and its components and help to maintain a maximum recharging capacity.

In the earlier examples the temperature of the energy conversion device 209 is regulated. Alternatively the method can be employed to regulate the temperature of any device within certain desired specifications and tolerances. For example, display 240 may have a greater minimum temperature range than the energy conversion device 209, and the airflow generation at step 330 may be controlled to increase the minimum temperature of the display 240. The airflow may also be controlled according to a temperature sensed in proximity to the display 240 or other temperature restricted device.

In a preferred embodiment, the generating step 330 includes: controlling a direction of the air stream based on at least the sensed temperature; and activating the air stream based on the at least detected first threshold. While in the aforementioned examples at step 320 the sensed temperature is a temperature in close proximity to the fuel storage device 207, there can be applications where the temperature is sensed in proximity to other heat generating or heat sinking devices, such as controller 220 and housing 210, or in proximity to the temperature restricted device such as energy conversion device 209 or display 240. Step 320 may include the sensing of multiple temperatures, and step 330 may include generating an air flow based on multiple sensed temperatures.

In one arrangement, the detection step 310 includes at least one of: (i) detecting a temperature limit above an upper threshold; and detecting a temperature limit below a lower threshold; (ii) detecting a oxygen limit above an upper threshold; and detecting an oxygen limit below a lower threshold; (iii) detecting a moisture limit above an upper threshold; and detecting a moisture limit below a lower threshold; and (iv) detecting a voltage, current or power limit.

In connection with item i above, a temperature is detected corresponding to sensing a temperature in close proximity to the energy storage module 205 or the energy conversion device 209 which is above an upper threshold or below a lower threshold. The upper and lower thresholds being related to the operating temperature range of the energy storage module 205 or the energy conversion device 209. Operation within the range ensures short and long term performance of the device. For example operating at a temperature above the operating temperature range may cause reduced output voltage of the energy storage module 205, or reduced current or power generating capability, and increased air flow is needed for heat to be carried away from the energy storage module 205 or the energy conversion device 209.

In connection with item ii, an oxygen level is detected. In a fuel cell, low oxygen level causes reduction reduced output voltage of the energy storage module 205, or reduced current or power generating capability. Increased air flow may be needed for the oxygen level to be increased.

In connection with item iii, a moisture level is detected. Fuel cells need to be hydrated for efficient energy conversion, and lack of moisture may cause reduced output voltage of the energy storage module 205, or reduced current or power generating capability. Fuel cells generate water vapor as a by-product, and condensed water vapor may cause flooding of a fuel cell, which would deprive the fuel cell of oxygen and cause reduced output voltage of the energy storage module 205, or reduced current or power generating capability. Increased air flow allows water vapor to be carried away from the energy storage module 205 or the energy conversion device 209. In this way flooding of the fuel cell electrode is minimized or avoided, although moisture may be detected and controlled for other reasons, wherever condensation may occur such as at housing 210.

In connection with item iv, an energy storage module output is detected. The output is typically a measured voltage. As mentioned in items i, ii, and iii, the voltage may be reduced when the temperature, oxygen level or moisture level goes above an upper limit, or below a lower limit. It may also be that the voltage is not reduced under high load impedance conditions, but the voltage is reduced under high load impedance conditions, which is a reduction in output current or output power. It may be advantageous, for reasons of size or cost of the mobile device, to simply measure the output voltage, current, or power instead of sensing oxygen or moisture.

In a preferred embodiment, the wireless communication method 300 can further include at least one of: providing sufficient amount of oxygen to the energy conversion module for energy conversion thereby ensuring adequate energy conversion reagents; providing a sufficient amount of moisture to the energy conversion module for energy conversion thereby ensuring sufficient hydration without excess condensation for efficient energy conversion; and providing a desired operating temperature range to the energy conversion device for energy conversion.

The energy conversion module can include at least one of: a battery, a fuel cell and an electrochemical capacitor.

Figure 4:
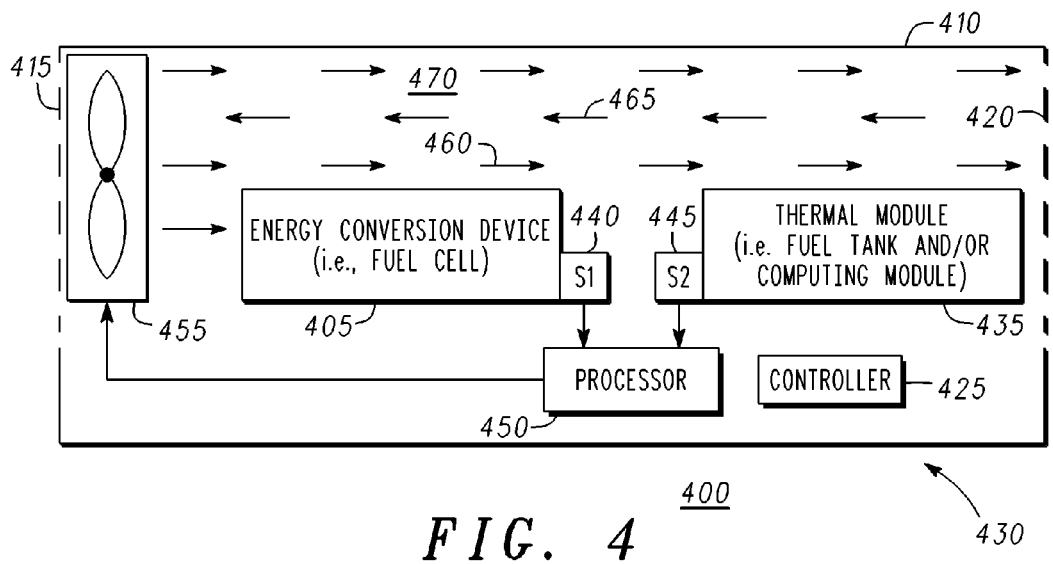
FIG. 4 is an exemplary partial simplified view along the lines 4-4 in FIG. 1, of an electronic device, such as a wireless communication device according to one embodiment.

In FIG. 4, an embodiment of a wireless communication device 400 configured with an energy conversion device 405, is shown. It includes: a housing 410 with a proximal vent 415 and a distal vent 420; a controller 425 coupled to the housing 410, the controller 410 configured to control the operations of the wireless communication device 400; and a circulation module 430 configured to detect a first threshold of an energy conversion device 405 comprising at least one of a temperature threshold, oxygen threshold, voltage threshold and moisture threshold, sense a temperature in proximity to a thermal module 430 comprising at least one of a fuel tank and electronic computing module, and generate an air stream based on the detected first threshold and the sensed temperature.

In a preferred arrangement, the circulation module 430 includes a first sensor 440 in proximity to the energy conversion device 405 and a second sensor 445 in proximity to the thermal module 435, coupled to a processor 450, to activate a blower 455. When activated, the blower 455 is configured to provide: a down stream air flow 460 in a direction from the proximal vent 415 to the distal vent 420; or an up stream air flow 465 in a direction from the distal vent 420 to the proximal vent 415.

In FIG. 4, a channel 470 is shown between the proximal and distal vents 415 and 420, for allowing a maximum air flow and circulation, for improved heating or cooling, with minimal drag. The energy conversion device 405 and thermal module are strategically positioned and aligned therein and therewith for improved air flow.

Figure 5:
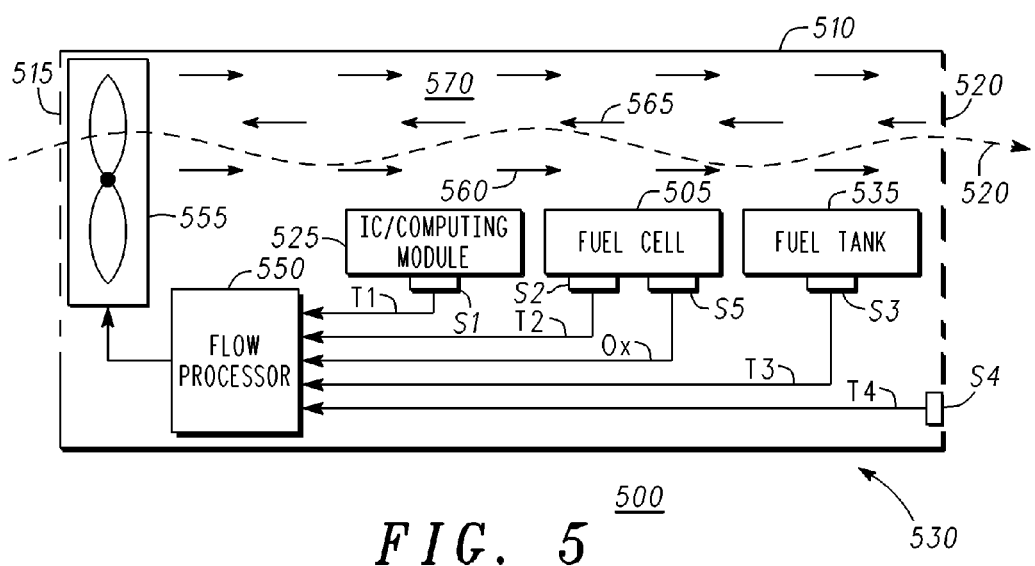
FIG. 5 is an exemplary partial simplified view along the lines 4-4 in FIG. 1, of an electronic device, such as a wireless communication device according to another embodiment.

In FIG. 5, an alternative embodiment of a wireless communication device 500 configured with an energy conversion device 505, is shown. It includes: a housing 510 with a proximal vent 515 and a distal vent 520; an IC, computing module or controller 525 coupled to the housing 410, the controller 525 configured to control the operations of the wireless communication device 500; and a circulation module 530 configured to detect thresholds of an energy conversion device 505 via sensor S2 and/or Ox sensor, controller 525 via sensor S1, fuel tank 53 via sensor S3 and housing or ambient temperature via sensor S4. In this embodiment T1, T2, T3 and T4 and oxygen measurements Ox are fed to the processor 550, to activate and generate an upstream 560 or downstream 565 air stream based thereon. In a first embodiment fuel cell 505 is the temperature restricted component. Blower 555 is activated upon detecting T2 or Ox above an upper threshold or below a lower threshold, to generate according to T1, T2, T3 and T4 either a downstream airflow 560 or an upstream airflow 565. The airflow direction is controlled such that T2 is not above an upper operational temperature limit or below a lower operational temperature limit of fuel cell 505. More generally, the airflow direction is controlled such that at least one of T1, T2, T3, and T4 are not above an upper operational temperature limit or below a lower operational temperature limit of IC/Computing module 525, fuel cell 505, fuel tank 535 and housing or ambient S4, respectively.

In a preferred arrangement, the circulation module 530 includes S1-S4 and Ox sensors connected to processor 550 via lines T1-T4 and Ox line, to activate a blower 555. When activated, the blower 555 is configured to provide: a down stream air flow 560 in a direction from the proximal vent 515 to the distal vent 520; or an up stream air flow 565 in a direction from the distal vent 520 to the proximal vent 515.

In FIG. 5, a channel 570 is shown between the proximal and distal vents 515 and 520, for allowing a maximum air flow and circulation, for improved circulation, heating or cooling, with minimal drag. The energy conversion device 505 and fuel tank 535 and controller 525 are strategically positioned and aligned therein and therewith for improved air flow and circulation.

The device 200 and method 300 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A wireless communication device, comprising:
   a housing including a wireless communication device including an energy conversion module, an energy conversion device including at least one of an electrochemical energy storage cell and a fuel cell and a thermal module;
   a controller coupled to the housing, the controller configured to control the operations of the wireless communication device; and
   a circulation module configured to detect a first threshold in an energy conversion device comprising at least one of a temperature threshold, oxygen threshold, voltage threshold, current threshold, power threshold and moisture threshold, sense a temperature in proximity to a thermal module, and generate an air stream based on the detected first threshold and the sensed temperature.

2. The wireless communication device of claim 1, wherein the circulation module is configured to: control a direction of the air stream based on at least the sensed temperature; and activate the air stream based on the at least detected first threshold.

3. The wireless communication method of claim 1, wherein the thermal module further comprises at least one of an operating temperature restricted device, and a heat generating device affecting the temperature of an operating temperature restricted device.

4. A wireless communication device, comprising:
a housing including a wireless communication device with a proximal vent and a distal vent and an energy conversion device;
a controller coupled to the housing, the controller configured to control the operations of the wireless communication device; and
a circulation module configured to detect a first threshold in an energy conversion device comprising at least one of a temperature threshold, oxygen threshold, voltage threshold, current threshold, power threshold and moisture threshold, sense a temperature in proximity to a thermal module comprising at least one of a fuel tank and an electronic computing module, and generate an air stream based on the detected first threshold and the sensed temperature,
the energy conversion device includes at least one of an electrochemical energy storage cell and a fuel cell.

5. The wireless communication device of claim 4, wherein the circulation module includes a first sensor in proximity to the energy conversion device and a second sensor in proximity to the thermal module, coupled to a processor, to activate a blower.

6. The wireless communication device of claim 5, wherein the blower, when activated, is configured to provide: a down stream air flow in a direction from the proximal vent to the distal vent; or an up stream air flow in a direction from the distal vent to the proximal vent.

7. The wireless communication device of claim 4, wherein the circulation module is configured to at least one of:
detect a temperature limit above an upper threshold; and detect a temperature limit below a lower threshold;
detect an oxygen limit above an upper threshold; and detect an oxygen limit below a lower threshold;
detect a moisture limit above an upper threshold; and detect a moisture limit below a lower threshold;
detect a voltage limit above an upper threshold; and detect a voltage limit below a lower threshold;
detect a current limit above an upper threshold; and detect a current limit below a lower threshold; and
detect a power limit above an upper threshold; and detect a power limit below a lower threshold.

8. The wireless communication device of claim 4, wherein the energy conversion device is configured to, at least one of: provide a desired operating temperature range to the energy conversion device, provide a sufficient amount of moisture to the energy conversion device, and provide a desired operating temperature range to the energy conversion device.

9. The wireless communication device of claim 4, wherein the energy conversion device includes at least one of: a battery, a fuel cell and an electrochemical capacitor.

10. The wireless communication method of claim 4, wherein the thermal module further comprises at least one of an operating temperature restricted device, and a heat generating device affecting the temperature of an operating temperature restricted device.

11. A wireless communication method, comprising:
providing a wireless communication device including an energy conversion module and a thermal module, the energy conversion module including an energy conversion device including at least one of an electrochemical energy storage cell and a fuel cell;
detecting a first threshold in an energy conversion module comprising at least one of a temperature threshold, oxygen threshold, a voltage threshold, a current threshold, a power threshold and moisture threshold;
sensing a temperature in proximity to a thermal module comprising at least one of a fuel tank, an electronic computing module, and a housing; and
generating an air stream based on the detected first threshold and the sensed temperature.

12. The wireless communication method of claim 11, wherein the generating step includes:
controlling a direction of the air stream based on at least the sensed temperature; and
activating the air stream based on the at least detected first threshold.

13. The wireless communication method of claim 11, wherein the detection step includes at least one of:
detecting a temperature limit above an upper threshold; and detecting a temperature limit below a lower threshold;
detecting a oxygen limit above an upper threshold; and detecting at oxygen limit below a lower threshold;
detecting a moisture limit above an upper threshold; and detecting a moisture limit below a lower threshold;
detecting a voltage limit above an upper threshold; and detecting a voltage limit below a lower threshold;
detecting a current limit above an upper threshold; and current a voltage limit below a lower threshold; and
detecting a power limit above an upper threshold; and detecting a power limit below a lower threshold.

14. The wireless communication method of claim 11, wherein the energy conversion module comprises a fuel cell.

15. The wireless communication method of claim 11, further comprising providing sufficient amount of oxygen to the energy conversion module for energy conversion.

16. The wireless communication method of claim 11, further comprising providing a sufficient amount of moisture to the energy conversion module for energy conversion.

17. The wireless communication method of claim 11, further comprising providing a desired operating temperature range to the energy conversion module for energy conversion.

18. The wireless communication method of claim 11, wherein energy conversion device includes at least one of: a battery, a fuel cell and an electrochemical capacitor.

19. The wireless communication method of claim 11, wherein the thermal module further comprises at least one of an operating temperature restricted device, and a heat generating device affecting the temperature of an operating temperature restricted device.

20. The wireless communication method of claim 19, further comprising controlling the airstream direction to at least one of reduce the maximum temperature and increase the minimum temperature of the operating temperature restricted device.

* * * * *